March 2, 1926.  1,574,821
S. KARPINSKY ET AL
APPARATUS FOR THE MANUFACTURE OF BUTTER
Filed April 2, 1924
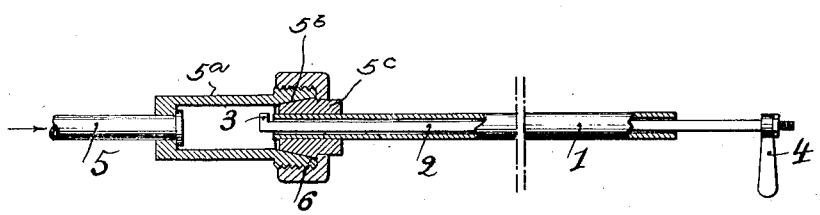
Inventors
S. Karpinsky
J. S. Anderson
By Marks & Clerk Patented Mar. 2, 1926.

1,574,821

UNITED STATES PATENT OFFICE.

STEPHAN KARPINSKY, OF SEVRES, AND JAMES STEWART ANDERSON, OF ST.-OUEN, FRANCE.

APPARATUS FOR THE MANUFACTURE OF BUTTER.

Application filed April 2, 1924. Serial No. 703,818.

*To all whom it may concern:*

Be it known that we, STEPHAN KARPINSKY, a Russian citizen, and residing at Sevres, Seine and Oise Department, No. 40 Rue Brancas, in the Republic of France, and JAMES STEWART ANDERSON, a subject of the Kingdom of Great Britain and Ireland, and residing at St.-Ouen, Seine Department, No. 114 Avenue des Batignolles, in the Republic of France, industrials, have invented certain new and useful Improvements in Apparatus for the Manufacture of Butter, of which the following is a specification.

The present invention relates to an apparatus of a very simple character for the manufacture of butter from cream which is suitably fermented or not.

Our said process consists essentially in forcing the cream, preliminarily charged with air, through a long and narrow passage. The product issuing from the said passage is analogous to what remains in the churn after the operation of churning the cream.

The output of butter is quite considerable, by the use of a long passage having a sufficiently narrow cross section.

This apparatus comprises a tube in which is freely placed a rod whereof the section is a little smaller than the inner section of the tube.

The cream which is to be transformed into butter, preliminarily charged with air will be forced under a pressure of two or more kilograms per square centimeter by any suitable means, for example a pump, through the narrow annular space existing between the rod and the wall of the tube. If this space is narrow and long enough, the cream is transformed into a mixture of buttermilk and globules of butter similar to what remains in the churn after churning of the cream. If the tube is not of a sufficient length, it will be necessary to cause the mixture to still pass one or several times through the apparatus in order to obtain all the butter that can possibly be obtained.

The use of the rod freely or loosely placed in the tube is essential: firstly because the rod allows of obtaining a very narrow space whatever the diameter of the tube may be so that in spite of the narrowness of the passage, the latter can have a relatively large total section, as required by an industrial apparatus having a somewhat large output; secondly, because the rod is never either perfectly rigid or straight, so that the width of the passage is not uniform at the several points of the length and because, in the flow of the cream, the molecules coming in contact with the walls vary in a repeated manner; moreover, the freedom of the rod allows the same of vibrating and this assists in causing the action of friction of the walls to be extended to all molecules of cream; finally, the freedom of the rod allows the operator of displacing the same in causing the same to revolve or to slide, in order to clean the walls in case a clogging occurs.

We have obtained satisfactory results with a tube having an internal diameter of 6 mm. and a rod of 5 mm. diameter, and also with a tube of 3.5 mm. and a rod of 2 mm. diameter, the tube having some 50 cm. length. But these dimensions are not of a limitative nature.

Obviously, the cross section of the tube and of the core may have any desired shape. Further, these elements may be rectilinear or may be curved in circular, helical or like form. It is advisable to employ a suitable form whereby the core can be readily removed from the tube for the cleaning of these elements. A plurality of like tubes can be juxtaposed and supplied by a common inlet, in order to obtain an increased output.

The appended drawings show by way of example a constructional form of an apparatus according to our invention, partly in elevation and partly in lengthwise section.

1 is the said tube and 2 the said core; the latter consists of a rod whose end adjacent the cream inlet is provided with a projection 3 serving to retain the said core by coming into contact with the end of the tube; the other end of said rod is provided with a removable handle 4 whereby the rod can be caused to slide or to rotate in the tube in order to break up an obstructing mass, or for like purposes.

The conduit 5 is soldered to a socket $5^a$ having a conical bore $5^b$ engaging a conical plug $5^c$, which is connected to a threaded cap 6. The socket $5^a$ has screw threads engaging the socket 6 and the plug $5^c$ is soldered to the tube 1.

We claim:

1. Apparatus for the manufacture of butter comprising a tube and a rod arranged in the said tube, leaving between their walls a very narrow annular space.

2. Apparatus for the manufacture of butter comprising a tube and a rod freely arranged in the said tube, leaving between their walls a very narrow annular space.

3. Apparatus for the manufacture of butter comprising a tube and a rod freely arranged in the said tube, leaving between their walls a very narrow annular space, the said rod having at one of its ends a projection adapted to abut against the inlet end of the said tube and at the opposite end, a handle.

4. The combination of a tube, a rod in the said tube, leaving between them a very narrow annular space, and means for forcing through this space cream charged with air for the purpose of transforming the same into butter.

In testimony that we claim the foregoing as our invention, we have signed our names.

STEPHAN KARPINSKY.
JAMES STEWART ANDERSON.